United States Patent
Gong et al.

(10) Patent No.: US 10,488,573 B2
(45) Date of Patent: Nov. 26, 2019

(54) LIGHT GUIDE PLATE, BACKLIGHT MODULE, DISPLAY DEVICE, DOTTING MACHINE AND CONTROL METHOD THEREOF

(71) Applicants: BOE TECHNOLOGY GROUP CO., LTD., Beijing (CN); BOE OPTICAL SCIENCE AND TECHNOLOGY CO., LTD., Suzhou, Jiangsu (CN)

(72) Inventors: Nuowei Gong, Beijing (CN); Shanfei Xu, Beijing (CN)

(73) Assignees: BOE TECHNOLOGY GROUP CO., LTD., Beijing (CN); BOE OPTICAL SCIENCE AND TECHNOLOGY CO., LTD., Suzhou, Jiangsu (CN)

( * ) Notice: Subject to any disclaimer, the term of this patent is extended or adjusted under 35 U.S.C. 154(b) by 2 days.

(21) Appl. No.: 15/742,480

(22) PCT Filed: Aug. 10, 2017

(86) PCT No.: PCT/CN2017/096793
§ 371 (c)(1),
(2) Date: Jan. 5, 2018

(87) PCT Pub. No.: WO2018/033013
PCT Pub. Date: Feb. 22, 2018

(65) Prior Publication Data
US 2019/0086602 A1   Mar. 21, 2019

(30) Foreign Application Priority Data
Aug. 16, 2016  (CN) .......................... 2016 1 0677694

(51) Int. Cl.
*F21V 8/00* (2006.01)
*G02B 6/00* (2006.01)
*G02F 1/1335* (2006.01)

(52) U.S. Cl.
CPC .............. *G02B 6/0043* (2013.01); *G02B 6/00* (2013.01); *G02B 6/0038* (2013.01); *G02F 1/133603* (2013.01); *G02F 1/133606* (2013.01)

(58) Field of Classification Search
CPC ................ G02B 6/0043; G02B 6/0038; G02F 1/133603; G02F 1/133606
See application file for complete search history.

(56) References Cited

U.S. PATENT DOCUMENTS

2003/0123245 A1* 7/2003 Parker .................... A61M 21/02
                                                            362/602
2004/0218376 A1* 11/2004 Ng ........................ G02B 6/0061
                                                            362/611
(Continued)

FOREIGN PATENT DOCUMENTS

CN         2877913 Y      3/2007
CN       101059580 A     10/2007
(Continued)

OTHER PUBLICATIONS

Huang Daoxing, CN-2877913-Y, Mar. 2007.*
(Continued)

*Primary Examiner* — Mary Ellen Bowman
(74) *Attorney, Agent, or Firm* — Womble Bond Dickinson (US) LLP

(57) ABSTRACT

The embodiments of the disclosure provide a light guide plate, a backlight module, a display device, a dotting machine and a control method thereof, related to the field of display technology, which can improve the brightness uniformity of the backlight module. The light guide plate includes a light exit surface, a bottom surface opposite to the light exit surface, and a light entrance surface intersecting with the light exit surface and the bottom surface. A plurality of dots are arranged at an outer side of the bottom surface;

(Continued)

a shape of a cross section of each dot is an ellipse or a polygon, and the cross section is parallel to the bottom surface.

12 Claims, 8 Drawing Sheets

(56) References Cited

U.S. PATENT DOCUMENTS

2015/0251329 A1  9/2015  Cao
2017/0363796 A1  12/2017  Ma et al.

FOREIGN PATENT DOCUMENTS

| CN | 201405527 Y | 2/2010 |
| CN | 103878227 A | 6/2014 |
| CN | 205139533 U | 4/2016 |
| CN | 106054310 A | 10/2016 |
| CN | 206096531 U | 4/2017 |
| JP | 2003-270448 A | 9/2003 |

OTHER PUBLICATIONS

Office Action received for Chinese Patent Application No. 201610677694.1, dated Jan. 2, 2018, 20 pages (10 pages of English Translation and 10 pages of Office Action).
International Search Report received for PCT Patent Application No. PCT/CN2017/096793, dated Sep. 28, 2017, 8 pages (3 pages of English Translation and 5 pages of Original Document).
Written Opinion received for PCT Patent Application No. PCT/CN2017/096793, dated Sep. 28, 2017, 8 pages (3 pages of English Translation and 5 pages of Original Document).
Office Action received for Chinese Patent Application No. 201610677694.1, dated Sep. 10, 2018, 23 pages (12 pages of English Translation and 11 pages of Office Action).

* cited by examiner

LIGHT GUIDE PLATE, BACKLIGHT MODULE, DISPLAY DEVICE, DOTTING MACHINE AND CONTROL METHOD THEREOF

RELATED APPLICATIONS

The present application is the U.S. national phase entry of the international application PCT/CN2017/096793, with an international filing date of Aug. 10, 2017, which claims the benefit of Chinese Patent Application No. 201610677694.1, filed on Aug. 16, 2016, the entire disclosures of which are incorporated herein by reference.

TECHNICAL FIELD

The present disclosure relates to a light guide plate, a backlight module, a display device, a dotting machine and a control method thereof.

BACKGROUND

Liquid crystal display (LCD) has the advantages of light and thin body, low power consumption, no radiation and long service life, and has dominated the current flat panel display market. In liquid crystal displays, the liquid crystal itself does not emit light, it only regulates light. In order to display an image on the screen of the liquid crystal display, a backlight module should be provided in the display panel.

Generally, the backlight modules include side light type backlight module and direct type backlight module according to the distribution position of the light source in the backlight module. The light source in the side light type backlight module is located at a lateral side of the display panel. The light source in the direct type backlight module is located at the bottom of the display panel. Due to its advantages such as low cost, thinness, the side light type backlight module is widely used in the industry.

The side light type backlight module includes a light guide plate and a light source, etc. In order to enable the light to be scattered to the light exit side of the light guide plate well, circular dots are usually arranged on the bottom surface opposite to the light exit side of the light guide plate.

SUMMARY

The embodiments of the disclosure apply the following technical solutions.

According to a first aspect, a light guide plate is provided. The light guide plate includes a light exit surface, a bottom surface opposite to the light exit surface, and a light entrance surface intersecting with the light exit surface and the bottom surface, a plurality of dots are arranged at an outer side of the bottom surface; a shape of a cross section of each dot is an ellipse or a polygon; the cross section is parallel to the bottom surface.

Optionally, the light guide plate further includes a first lateral surface adjacent to the light entrance surface; a first intersection line is formed between the first lateral surface and the bottom surface; a first angle is formed between a long side of a circumscribed rectangle of the ellipse or a long side of the polygon and the first intersection line.

Further optionally, the light guide plate further includes a second lateral surface opposite to the light entrance surface; in the region close to the second lateral surface, a second angle is formed between the long side of a circumscribed rectangle of the ellipse or the long side of the polygon and the first intersection line; the second angle is different from the first angle.

Further optionally, in the region close to the light entrance surface and corresponding to a light source, the plurality of dots are distributed in a fan shape, and a long side of a circumscribed rectangle of the ellipse or the long side of the polygon points to the light source.

Based on the above, optionally, the shape of the polygon is a rectangle or a trapezoid.

According to a second aspect, a backlight module is provided, which includes the light guide plate according to the first aspect and a light source located at the light entrance surface.

According to a third aspect, a display device is provided, which includes the backlight module according to the second aspect.

According to a fourth aspect, a dotting machine is provided, which includes a frame, a solenoid valve fixed in the frame, and a cutter holder. A hole is arranged at a position of the frame corresponding to a pillar of the solenoid valve, and the pillar is capable of protruding from the hole.

The cutter holder is arranged on an outside of the frame close to the solenoid valve, and the cutter holder and the frame are connected by an elastic member; the cutter holder includes a housing and a cutter, the cutter is fixed to the housing and protrudes from the housing; and the shape of the cross section of the cutter is an ellipse or a polygon.

Optionally, the dotting machine further includes a stepping motor arranged in the housing and fixed to the housing, and a driver for controlling the stepping motor to rotate; the stepping motor is used to control the cutter to rotate; the stepping motor is arranged at a side of the cutter close to the solenoid valve and is fixed to the cutter.

Based on the above, optionally, the stepping motor and the cutter are detachably fixed.

According to a fifth aspect, a control method of the dotting machine is provided. The method includes: moving a stepping motor and a cutter up and down by a solenoid valve to form grooves on a mold core, and forming dots with the grooves.

Optionally, the driver controls the stepping motor to drive the cutter to rotate.

BRIEF DESCRIPTION OF THE DRAWINGS

In order to more clearly illustrate the technical solutions in embodiments of the disclosure or in the prior art, the appended drawings needed to be used in the description of the embodiments or the prior art will be introduced briefly in the following. Obviously, the drawings in the following description are only some embodiments of the disclosure, and for those of ordinary skills in the art, other drawings may be obtained according to these drawings under the premise of not paying out creative work.

DETAILED DESCRIPTION OF THE DISCLOSURE

In the following, the technical solutions in the embodiments of the disclosure will be described clearly and completely in connection with the drawings in the embodiments of the disclosure. Obviously, the described embodiments are only part of the embodiments of the disclosure, and not all of the embodiments. Based on the embodiments in the disclosure, all other embodiments obtained by those of ordinary skills in the art under the premise of not paying out creative work pertain to the protection scope of the disclosure.

It is realized that circular dots scatter light evenly in all directions, so that bright lines may appear at the bottom or the side of the light guide plate in the display device with an ultra-narrow frame design, thereby affecting the brightness uniformity of the backlight module.

The embodiments of the disclosure provide a light guide plate, a backlight module, a display device, a dotting machine and a control method thereof, which can improve the brightness uniformity of the backlight module.

Figure 1:
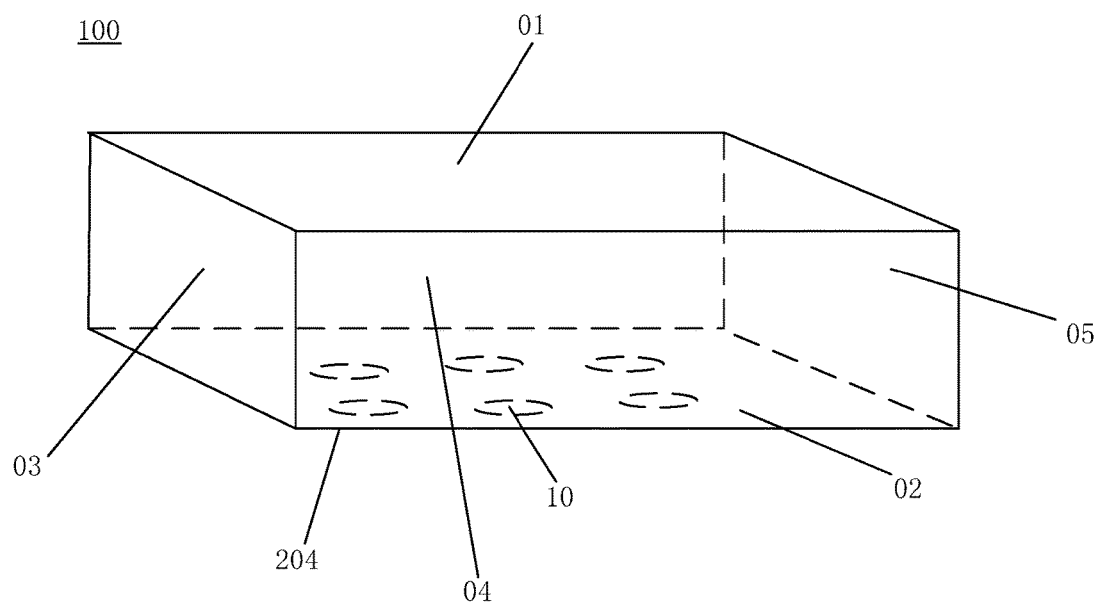
FIG. 1 is a structural schematic diagram of a light guide plate provided by an embodiment of the disclosure.

An embodiment of the disclosure provides a light guide plate 100. As shown in FIG. 1, the light guide plate 100 includes a light exit surface 01, a bottom surface 02 opposite to the light exit surface 01, and a light entrance surface 03 intersecting with the light exit surface 01 and the bottom surface 02. A plurality of dots 10 are arranged at an outer side of the bottom surface 02; a shape of a cross section of each dot 10 is an ellipse or a polygon; the cross section is parallel to the bottom surface 02.

It should be noted that, firstly, the shape of the bottom surface 02 of the light guide plate is not limited. For example, it can be a plane parallel to the light exit surface 01, or can be a wedge surface, of course, other planes can also be used. In the example provided by FIG. 1, the shape of the bottom surface 02 is a plane, and the disclosure is not limited to this.

Figure 2:
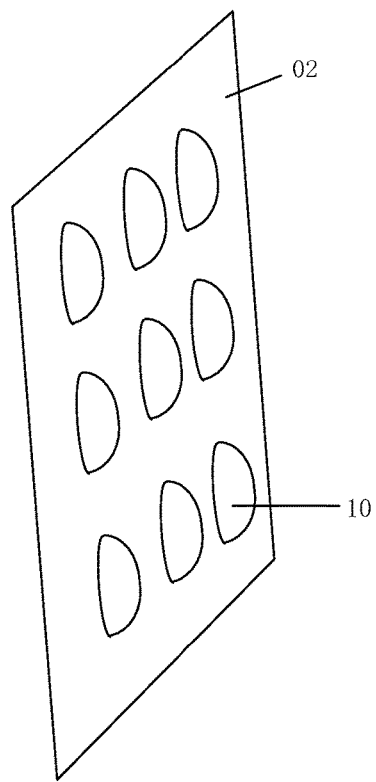
FIG. 2 is a structural schematic diagram of a bottom surface of a light guide plate provided by an embodiment of the disclosure.

Secondly, those skilled in the art should understand that after the mold core is processed by the dotting machine, a plurality of grooves are formed on the mold core surface. On this basis, a layer of photosensitive adhesive can be coated on the surface of the mold core, the light guide plate 100 with the dots 10 can thus be formed after the photosensitive adhesive is cured and detached. In the light guide plate 100 formed with this method, as shown in FIG. 2, the dots 10 bulge outwardly.

The outer side of the bottom surface 02 is a side of the bottom surface 02 facing away from the light exit surface 01.

In addition, the arrangement of the dots 10 is not limited, and the arrangement of dots can be preset according to the user requirements by the light guide plate dots design software. FIG. 1 and FIG. 2 merely show the arrangement of the dots 10 exemplarily, which is not limited herein.

Thirdly, when the shape of the cross section of the dot 10 is an ellipse, the shape of the dots 10 can be a structure with an elliptical cross section such as a semi-ellipsoid, an elliptical cylinder or an elliptical cone. When the shape of the cross section of the dot 10 is a polygon, the shape of the dots 10 can be a cube, a trapezoid, a triangular prism, a polyhedron, etc.

Figure 3A:
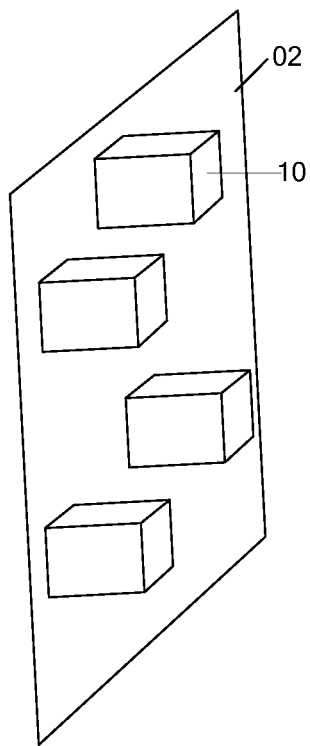
FIG. 3(a) is a structural schematic diagram of a bottom surface of a light guide plate provided by an embodiment of the disclosure.
Figure 3B:
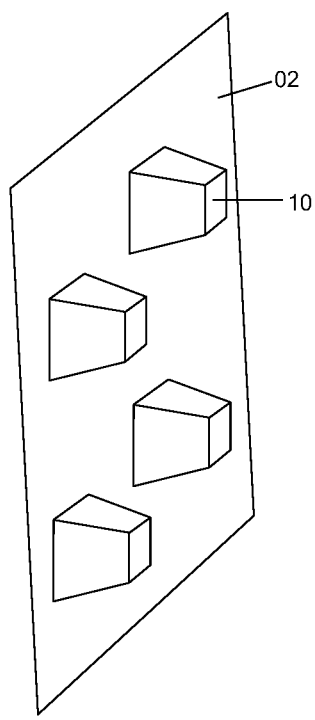
FIG. 3(b) is a structural schematic diagram of a bottom surface of a light guide plate provided by an embodiment of the disclosure.

Those skilled in the art should understand that, for a groove formed on the mold core by the dotting machine, the area of the bottom surface of the groove should be less than or equal to the area of the opening opposite to the bottom surface of the groove. That is, for the dots 10, along the extending direction perpendicular to the bottom surface 02 of the light guide plate and departing away from the bottom surface 02, the cross section areas of a dot are the same as shown in FIG. 3(a) or the cross section areas of a dot gradually decrease as shown in FIG. 3(b).

An embodiment of the disclosure provides a light guide plate 100, with an elliptical or polygonal cross section, the dots will have a certain directional reflection for light within the dots. The circular dots reflect light evenly in all directions, hence the dots with an elliptical or polygonal cross section have better directionality for light than the circular dots. In the light guide plate 100 provided by the embodiment of the disclosure, light at the position with high brightness can be more directionally reflected to other positions by arranging dots 10 with an elliptical or polygonal cross section on the outer side of the bottom surface 02 of the light guide plate 100 and adjusting the arrangement of dots 10, so as to reduce the brightness at this position. Therefore, the problem of bright lines on the light guide plate 100 in the prior art is well solved. When the light guide plate 100 according to the embodiment of the disclosure is applied to a backlight module, the brightness uniformity of the backlight module can be improved.

Figure 4A:
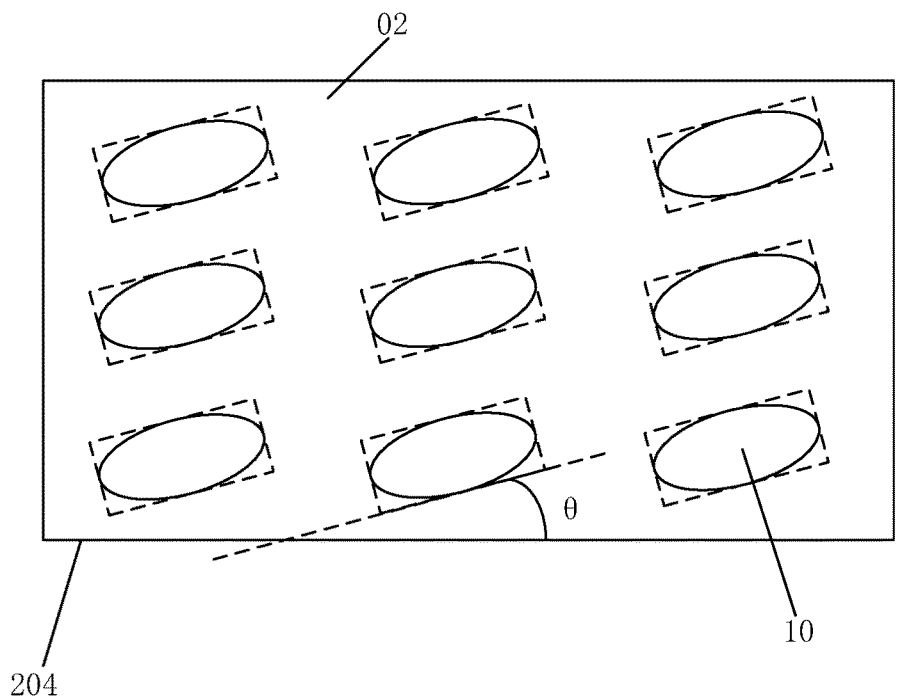
FIG. 4(a) is a structural schematic diagram of a bottom surface of a light guide plate provided by an embodiment of the disclosure.
Figure 4B:
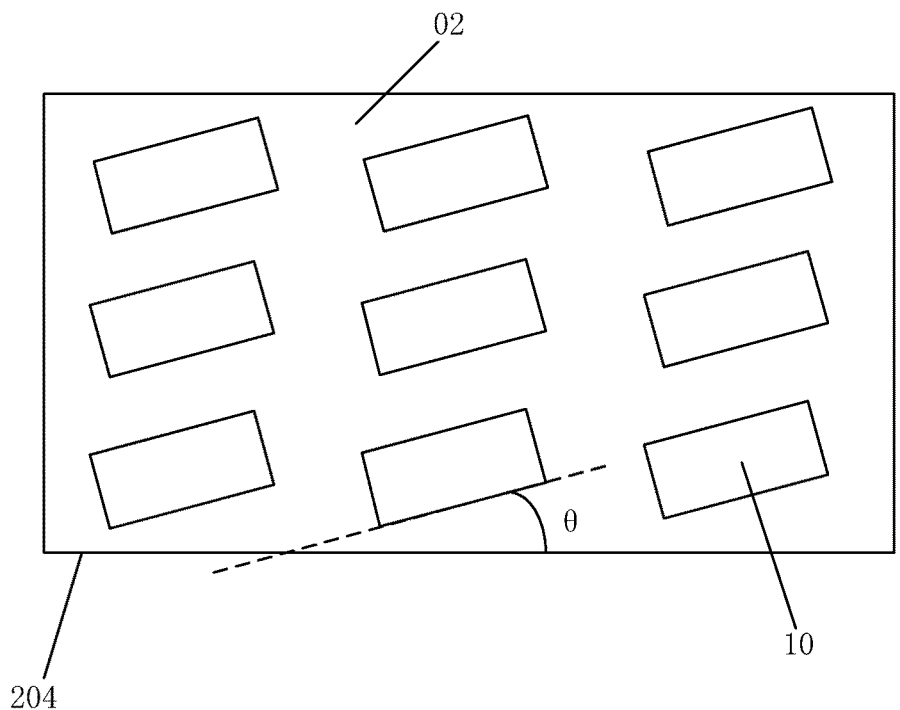
FIG. 4(b) is a structural schematic diagram of a bottom surface of a light guide plate provided by an embodiment of the disclosure.
Figure 4C:
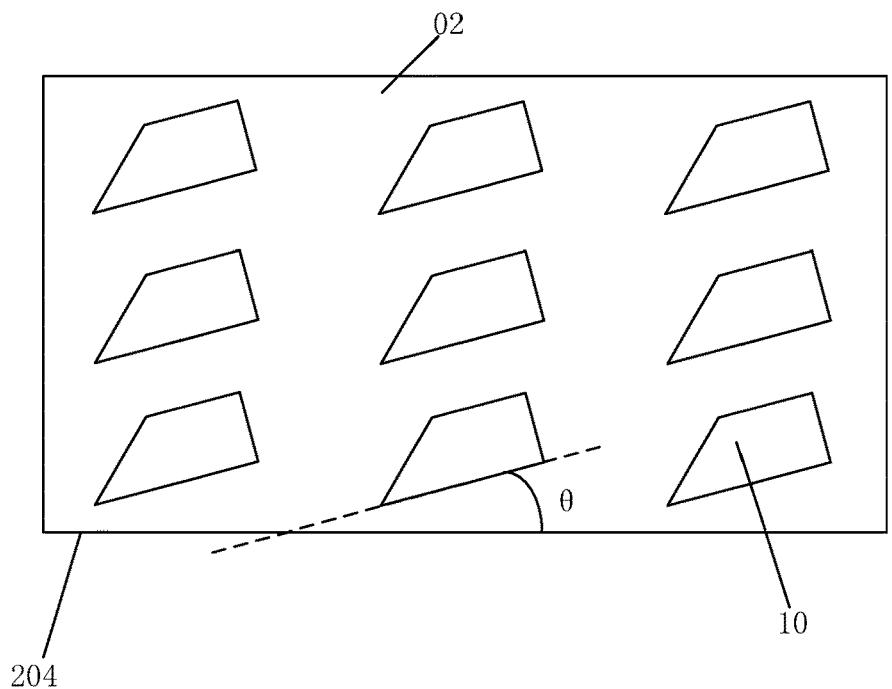
FIG. 4(c) is a structural schematic diagram of a bottom surface of a light guide plate provided by an embodiment of the disclosure.
Figure 4D:
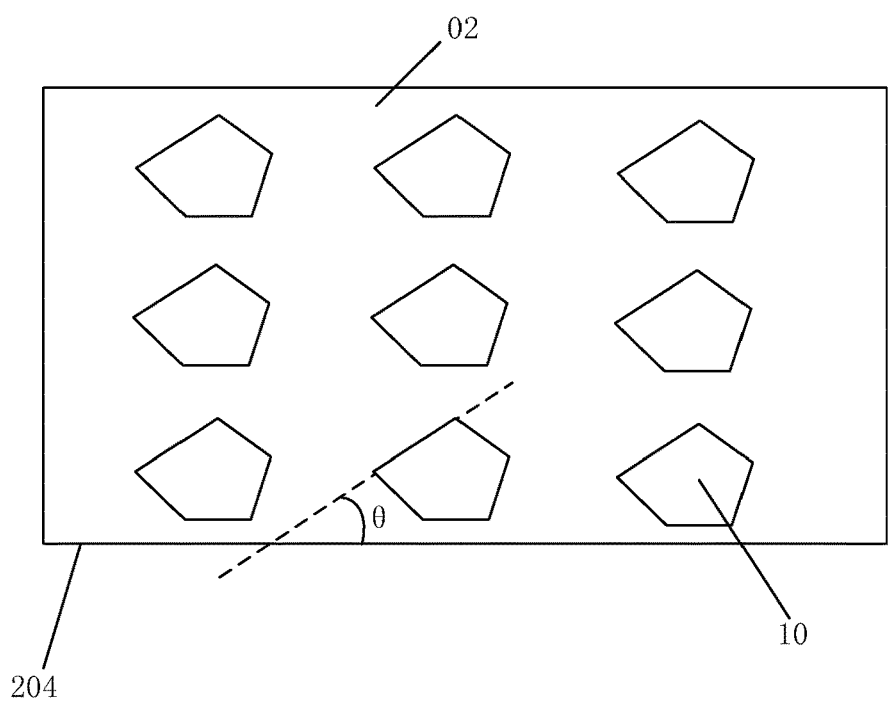
FIG. 4(d) is a structural schematic diagram of a bottom surface of a light guide plate provided by an embodiment of the disclosure.
Figure 5:
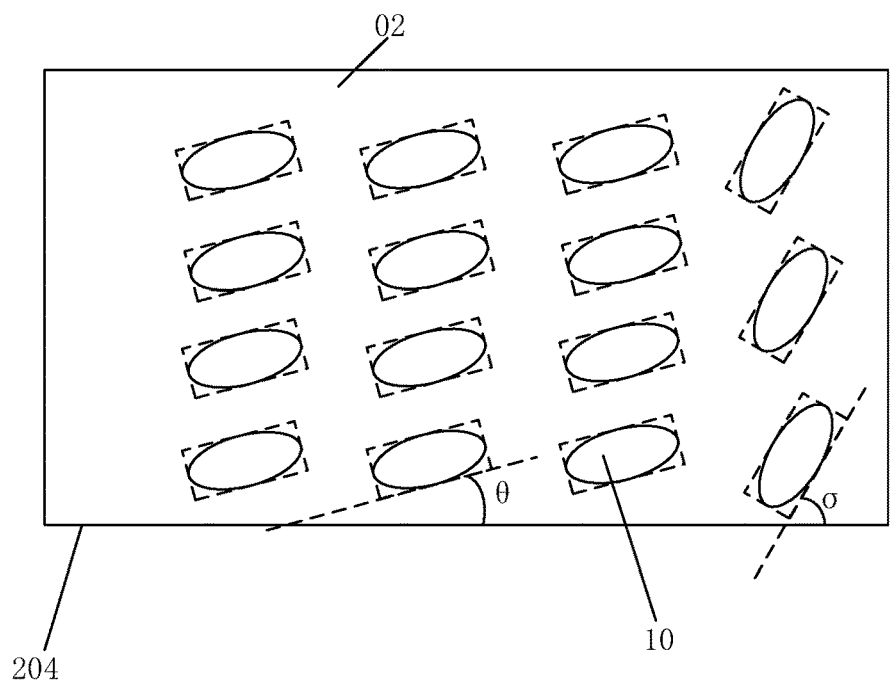
FIG. 5 is a structural schematic diagram of a bottom surface of a light guide plate provided by an embodiment of the disclosure.

Optionally, as shown in FIG. 1, the light guide plate 100 further includes a first lateral surface 04 adjacent to the light entrance surface 03; a first intersection line 204 is formed between the first lateral surface 04 and the bottom surface 02. On this basis, when the shape of the cross section of the dot 10 is an ellipse, as shown in FIG. 4(a) and FIG. 5, a first angle θ is formed between a long side of a circumscribed rectangle of the ellipse and the first intersection line 204. Alternatively, when the shape of the cross section of the dot 10 is a polygon, as shown in FIGS. 4(b)~4(d), a first angle θ is formed between a long side of the polygon and the first intersection line 204.

The first angle is greater than or equal to 0° and less than 180°.

It should be noted that, firstly, those skilled in the art should understand that, for a regular polygon, all the sides have the same length, and therefore, any side can be regarded as a long side. When setting the angle θ between the long side and the first intersection line 204, one of the sides can be taken as a reference. For other polygons, as shown in FIGS. 4(*b*)~4(*d*), the longest side can be taken as a reference.

The shape of the polygon can be, for example, a rectangle, a trapezoid, a pentagon, but is not limited to these.

Secondly, there are two lateral surfaces adjacent to the light entrance surface 03. The first lateral surface 04 in the embodiment of the disclosure can be at least one of the two adjacent lateral surfaces.

Thirdly, for the dots 10 on the bottom surface 02, the first angles θ between the long sides of the circumscribed rectangles of the ellipses or the long sides of the polygons of the cross sections of the dots 10 and the first intersection line 204 can be the same or different. The value of the first angle θ can be in the range of 0° to 180°. In FIGS. 4(*b*)~4(*d*) and FIG. 5, the first angles θ between the long sides of the circumscribed rectangles of the ellipses or the long sides of the polygons of the cross sections of the respective dots 10 and the first intersection line 204 are illustrated as the same, which are not limited herein.

In the embodiment of the disclosure, the first angle θ in the range of 0°-180° is set between the long side of the circumscribed rectangle of the ellipse or the long side of the polygon and the first intersection line 204. By changing the first preset value, the arrangement of the dots is adjusted, thus reflecting the light in different light paths, so that the bright lines on the sides of the light guide plate 100 can be eliminated.

Further optionally, as shown in FIG. 1, the light guide plate 100 further includes a second lateral surface 05 opposite to the light entrance surface 03. In the region close to the second lateral surface 05, as shown in FIG. 5, a second angle σ is formed between the long side of the circumscribed rectangle of the ellipse and the first intersection line 204; alternatively, a second angle σ is formed between the long side of the polygon and the first intersection line 204.

The second angle is greater than or equal to 0° and less than 180°, and the second angle is different from the first angle.

It should be noted that, firstly, for solving the problem of the side bright line on the bottom surface 02, in the region close to the second lateral surface 05, the second angles σ between the long sides of the circumscribed rectangles of the ellipses or the long sides of the polygons of the cross sections of the dots 10 and the first intersection line 204 can be the same or different. The value of the second angle σ can be in the range of 0° to 180°. In the example shown in FIG. 5, for solving the problem of the side bright line, the second angles θ between the long sides of the circumscribed rectangles of the ellipses or the long sides of the polygons of the cross sections of the dots 10 and the first intersection line 204 are the same, which are not limited herein.

Secondly, those skilled in the art should understand that the embodiment of the disclosure solves the bright line problem at different positions through the directionality for light of the dots 10. Therefore, the arrangement of the dots 10 for solving the bright line problem at the first lateral surface 04 should be different from the arrangement of the dots 10 for solving the bright line problem at the second lateral surface 05. However, since the first angle is in the range of 0° to 180° and the second angle is also in the range of 0° to 180°, the first angle and the second angle can be completely different or can be partially different.

In the embodiment of the disclosure, in the region close to the second lateral surface 05, the second angle σ between the long side of the circumscribed rectangle of the ellipse or the long side of the polygon and the first intersection line 204 is set in the range of 0° to 180°. By changing the value of the second angle, the arrangement of the dots can be adjusted, thus reflecting light in different light paths, so that bright lines at the tail of the light guide plate 100 (i.e. the second lateral surface 05) in the display device with the ultra-narrow frame design can be eliminated.

Figure 6A:
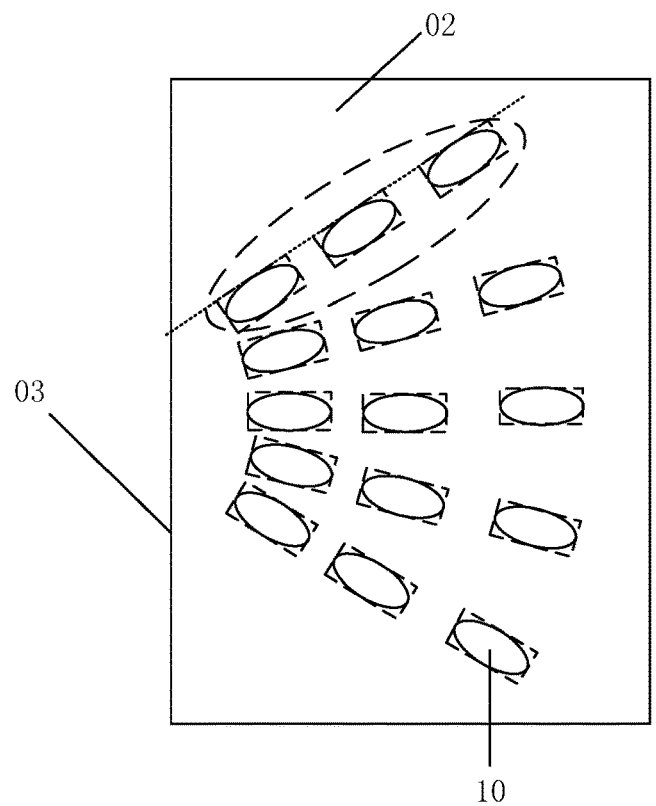
FIG. 6(a) is a structural schematic diagram of a bottom surface of a light guide plate provided by an embodiment of the disclosure.
Figure 6B:
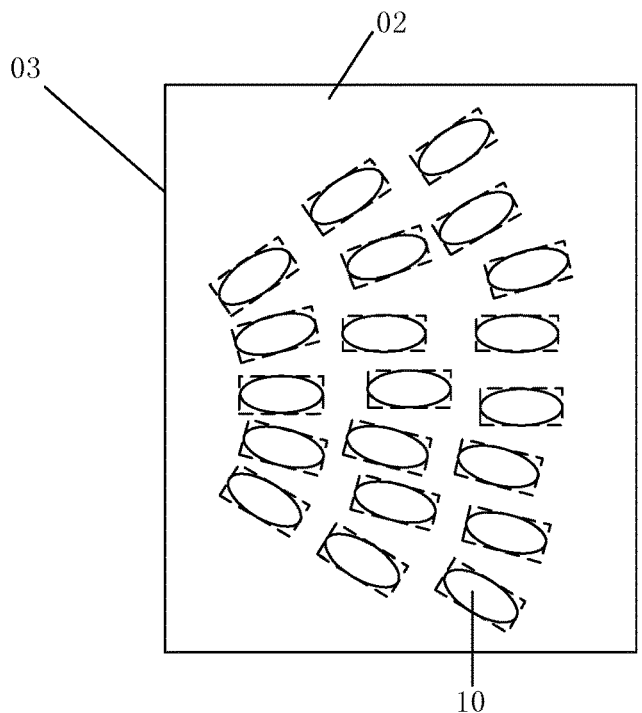
FIG. 6(b) is a structural schematic diagram of a bottom surface of a light guide plate provided by an embodiment of the disclosure.
Figure 6C:
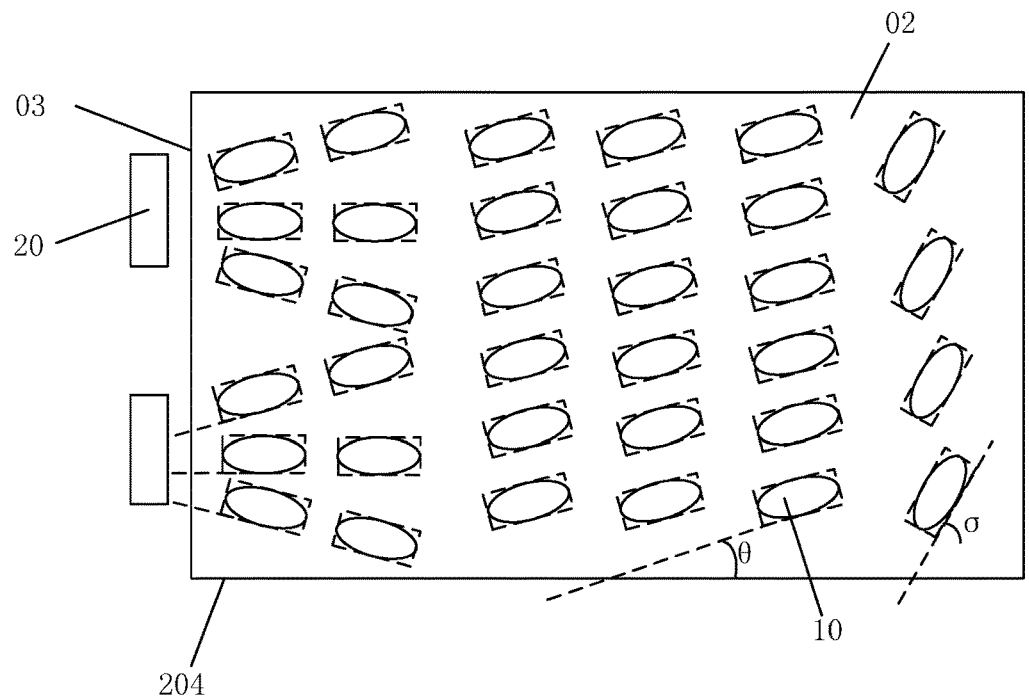
FIG. 6(c) is a structural schematic diagram of a bottom surface of a light guide plate provided by an embodiment of the disclosure.

Further optionally, as shown in FIGS. 6(*a*)~6(*c*), in the region close to the light entrance surface 03 and corresponding to the light source 20, the plurality of dots 10 are distributed in a fan shape, and the long sides of the circumscribed rectangles of the ellipses or the long sides of the polygons point to the light source 20.

In addition, since the light emitting diode (LED) has the advantages of high brightness, low heat, low energy consumption and long service life, in an optional embodiment of the disclosure, the light source 20 is an LED.

It should be noted that, the embodiments in FIG. 6(*a*) and FIG. 6(*b*) only show the arrangement of the dots 10 corresponding to one light source 20, which is not limited in the disclosure.

In the embodiment of the disclosure, in the region close to the light entrance surface 03 and corresponding to the light source 20, the plurality of dots 10 are distributed in a fan shape, and the long sides of the circumscribed rectangles of the ellipses or the long sides of the polygons point to the light source 20. As a result, light can be more directionally scattered to the light exit surface of the light guide plate, so that the problem of bright and dark area (firefly problem) at the light exit surface of the light guide plate due to the limit of light emitting angle of the light source 20 can be well solved, which further improves the brightness uniformity of the light guide plate 100.

An embodiment of the disclosure provides a backlight module, which includes the above light guide plate 100 and a light source located at the light entrance surface 03. The backlight module provided by the embodiment of the disclosure is a side light type backlight module.

With an elliptical or polygonal cross section, the dots will have a certain directional reflection for light within the dots. The circular dots reflect light evenly in all directions, hence the dots with an elliptical or polygonal cross section have better directionality for light than the circular dots. In the backlight module provided by the embodiment of the disclosure, light at the position with high brightness can be more directionally reflected to other positions by arranging dots 10 with an elliptical or polygonal cross section on the outer side of the bottom surface 02 of the light guide plate 100 and adjusting the arrangement of dots 10, so as to reduce the brightness at this position. Therefore, the problem of bright lines on the light guide plate 100 in the prior art is well solved, and the brightness uniformity of the backlight module is improved.

An embodiment of the disclosure further provides a display device, which includes the above backlight module. The above display device can be any product or component with a display function, such as a liquid crystal display, a liquid crystal television, a digital photo frame, a telephone, a tablet computer.

With an elliptical or polygonal cross section, the dots will have a certain directional reflection for light within the dots.

The circular dots reflect light evenly in all directions, hence the dots with an elliptical or polygonal cross section have better directionality for light than the circular dots. In the display device provided by the embodiment of the disclosure, light at the position with high brightness can be more directionally reflected to other positions by arranging dots 10 with an elliptical or polygonal cross section on the outer side of the bottom surface 02 of the light guide plate 100 of the backlight module and adjusting the arrangement of dots 10, so as to reduce the brightness at this position. Therefore, the problem of bright lines on the light guide plate 100 in the prior art is well solved and the brightness uniformity of the backlight module can be improved, thus improving the picture quality of the display device.

Figure 7A:
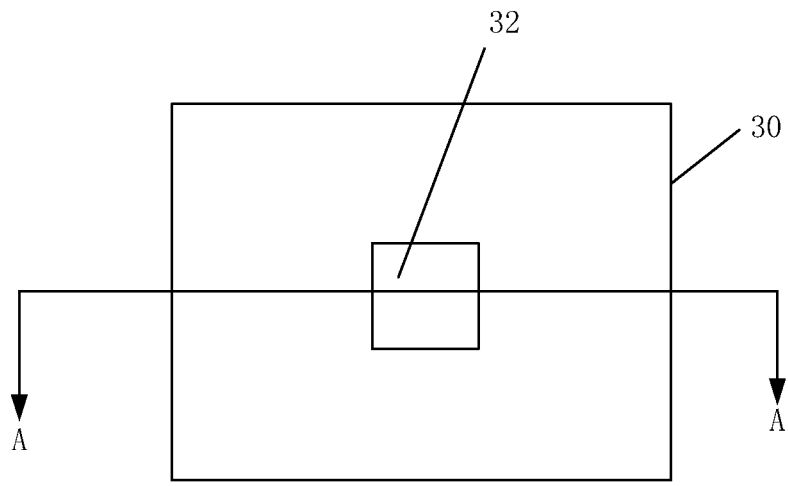
FIG. 7(a) is a structural schematic diagram of a dotting machine provided by an embodiment of the disclosure.
Figure 7B:
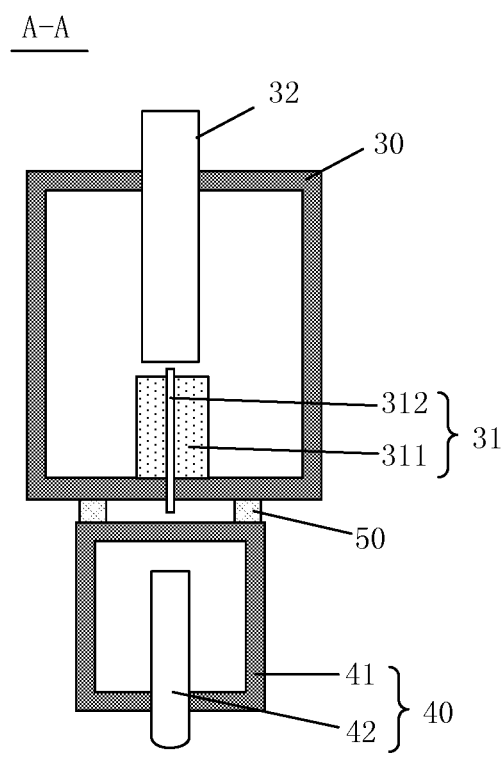
FIG. 7(b) is a first cross section view of a dotting machine along the A-A line in FIG. 7(a)

An embodiment of the disclosure provides a dotting machine. As shown in FIG. 7 (*a*) and FIG. 7 (*b*), the dotting machine includes a frame 30, a solenoid valve 31 fixed in the frame 30, and a cutter holder 40. A hole 33 is arranged at a position of the frame 30 corresponding to a pillar 312 of the solenoid valve 31, and the pillar 312 is capable of protruding from the hole 33. The cutter holder 40 is arranged on an outside of the frame 30 close to the solenoid valve 31, and the cutter holder 40 and the frame 30 are connected by an elastic member 50. The cutter holder 40 includes a housing 41 and a cutter 42. The cutter 42 is fixed to the housing 41 and protrudes from the housing 41. The shape of the cross section of the cutter is an ellipse or a polygon.

Herein, the solenoid valve 31 includes a shell 311 and a pillar 312 in the shell 311, and the pillar 312 moves up and down under the action of the electromagnetic field generated by the shell 311. The dotting machine also further includes a micrometer 32. As shown in FIG. 7(*b*), the micrometer 32 is fixed above the frame 30, and the end of the micrometer 32 close to the solenoid valve 31 corresponds to the pillar 312. By adjusting the distance between the micrometer 32 and the pillar 312, the downward movement distance of the pillar 312 can be adjusted, thereby controlling the downward movement distance of the cutter holder 40 to adjust the depth of the dots.

The operating principle of the dotting machine is as follows. Firstly, the cutter holder 40 is driven to move up and down by the up-and-down movement of the pillar 312 in the solenoid valve 31, so that the cutter 42 hits the mold core and forms grooves on the mold core. The move frequency of the cutter 42 is controlled by controlling the move frequency at which the pillar 312 moves up and down. On this basis, the frame 30 and the cutter holder 40 are horizontally moved by a moving structure (not shown in the figure) to achieve hitting of the cutter 42 at different positions on the mold core surface.

It should be noted that, firstly, the way in which the micrometer 32 and the solenoid valve 31 are fixed to the frame 30 is not limited, as long as the side of the micrometer 32 close to the solenoid valve 31 corresponds to the pillar 312.

Secondly, the way in which the cutter 42 is fixed to the housing 41 is not limited, as long as the cutter 42 can be fixed.

In addition, the specific number and arrangement of the elastic members 50 connecting the frame 30 and the cutter holder 40 are not limited, as long as the cutter holder 40 can be steadily and elastically extended and contracted.

In the dotting machine provided by the embodiment of the disclosure, by setting the shape of the cross section of the cutter 42 to be elliptical or polygonal, the shape of the cross section of the grooves formed on the mold core through the dotting machine is a corresponding elliptical or polygonal shape. As a result, the shape of the cross section of the dot 10 on the light guide plate produced by applying the mold core is also elliptical or polygonal, and the brightness uniformity of the light guide plate 100 can be improved.

Figure 8:
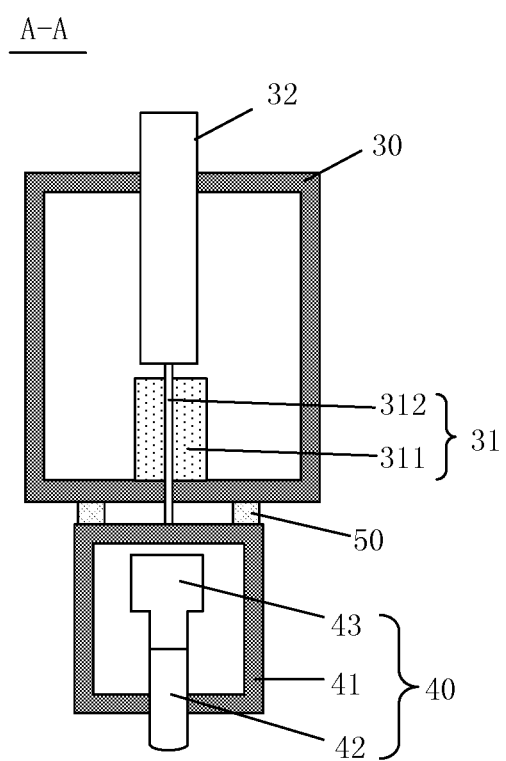
FIG. 8 is a second cross section view of a dotting machine along the A-A line in FIG. 7(a).

Optionally, as shown in FIG. 8, the dotting machine further includes a stepping motor 43 arranged in the housing 41 and fixed to the housing 41, and a driver 44 for controlling the stepping motor to rotate; the stepping motor 43 is used to control the cutter 42 to rotate. The stepping motor 43 is arranged at a side of the cutter 42 close to the solenoid valve 31 and is fixed to the cutter 42.

It should be noted that, firstly, the way in which the stepping motor 43 is fixed to the housing 41 is not limited, as long as the stepping motor 43 can be fixed.

In addition, driven by the stepping motor driver, the central axis of the stepping motor 43 is rotated horizontally. Those skilled in the art should understand that the cutter 42 can be driven to rotate horizontally by fixing the central axis of the stepping motor 43 to the cutter 42. The way in which the central axis of the stepping motor 43 is fixed to the cutter 42 is not limited, as long as the stepping motor 43 and the cutter 42 can be integrally connected.

In order to improve the applicability of the dotting machine, in an optional embodiment of the disclosure, the central axis of the stepping motor 43 and the cutter 42 are detachably fixed, for example, through couplings, flanges, etc.

Secondly, the type of the stepping motor 43 is not limited. For example, the stepping motor 43 can be a permanent magnet stepping motor, a reaction stepping motor, or a hybrid stepping motor mixing the advantages of permanent magnet stepping motor and reaction stepping motor.

Thirdly, after the stepping motor 43 and the cutter 42 are connected together, no relative movement occurs between the stepping motor 43, the cutter 42 and the cutter holder 40. During operation, the solenoid valve 31 drives the cutter holder 40 to move up and down.

In the embodiment of the disclosure, the stepping motor 43 is arranged in the dotting machine, and the stepping motor 43 drives the cutter 42 to rotate, so that grooves of various arrangement can be processed on the mold core by the dotting machine, thereby forming dots corresponding to the arrangement, thus the applicability of the light guide plate 100 can be improved.

An embodiment of the disclosure further provides a control method of the dotting machine, the method includes: moving a stepping motor 43 and a cutter 42 up and down by a solenoid valve 31 to form grooves on a mold core, and forming dots with the grooves.

In the control method of the dotting machine provided by the embodiment of the disclosure, by setting the shape of the cross section of the cutter 42 of the dotting machine to be elliptical or polygonal, the shape of the cross section of the grooves formed on the mold core through the dotting machine is a corresponding elliptical or polygonal shape. As a result, the shape of the cross section of the dot 10 of the light guide plate produced by the mold core is also elliptical or polygonal, and the brightness uniformity of the light guide plate 100 can be improved.

Optionally, the driver 44 controls the stepping motor 43, and the stepping motor 43 drives the cutter 42 to rotate.

The stepping motor 43 drives the cutter 42 to rotate horizontally while moving up and down, so that the angles of the grooves formed by the dotting machine change accordingly, thereby forming grooves with different arrangement, to complete the preparation of the light guide plate 100. The arrangement of the dots 10 on the light guide plate 100 can be simulated by a light guide plate design software. On this basis, the controller of the stepping motor controls the stepping motor 43, and the stepping motor 43 drives the cutter 42 to rotate, thereby forming grooves with the same arrangement.

In the embodiment of the disclosure, the stepping motor 43 is arranged in the dotting machine, and the stepping motor 43 drives the cutter 42 to rotate, so that grooves of various arrangement can be processed on the mold core by the dotting machine to form dots corresponding to the arrangement, thus the applicability of the light guide plate 100 can be improved.

The embodiments of the disclosure provide a light guide plate, a backlight module, a display device, a dotting machine and a control method thereof. With an elliptical or polygonal cross section, the dots will have a certain directional reflection for light within the dots. The circular dots reflect light evenly in all directions, hence the dots with an elliptical or polygonal cross section have better directionality for light than the circular dots. In the embodiments of the disclosure, light at the position with high brightness can be more directionally reflected to other positions by arranging dots with an elliptical or polygonal cross section on the outer side of the bottom surface of the light guide plate and adjusting the arrangement of dots, so as to reduce the brightness at this position. Therefore, the problem of bright lines on the light guide plate in the prior art is well solved. When the light guide plate according to the embodiment of the disclosure is applied to a backlight module, the brightness uniformity of the backlight module can be improved.

Those of ordinary skills in the art should understand that, all or a part of steps of implementing the above method can be implemented by a program instruction related hardware. The program can be stored in a computer readable storage medium, and when executed, the program executes the steps of the above method. The storage medium includes various media capable of storing program codes, such as a ROM, a RAM, a magnetic disk, or an optical disk.

The above embodiments are only used for explanations rather than limitations to the present disclosure, the ordinary skilled person in the related technical field, in the case of not departing from the spirit and scope of the present disclosure, may also make various modifications and variations, therefore, all the equivalent solutions also belong to the scope of the present disclosure, the patent protection scope of the present disclosure should be defined by the claims.

What is claimed is:

1. A light guide plate, comprising: a light exit surface, a bottom surface opposite to the light exit surface, and a light entrance surface intersecting with the light exit surface and the bottom surface, wherein a plurality of dots are arranged at the outer side of the bottom surface;
   wherein a shape of a cross section of each dot is an ellipse or a polygon;
   the cross section is parallel to the bottom surface;
   and wherein in a region adjacent to the light entrance surface and corresponding to a light source, the plurality of dots are distributed in a fan shape, and a long side of a circumscribed rectangle of the ellipse or the long side of the polygon points to the light source.

2. The light guide plate according to claim 1, further comprising a first lateral surface adjacent to the light entrance surface; wherein a first intersection line is formed between the first lateral surface and the bottom surface;
   wherein a first angle is formed between a long side of a circumscribed rectangle of the ellipse or a long side of the polygon and the first intersection line.

3. The light guide plate according to claim 2, further comprising a second lateral surface opposite to the light entrance surface;
   wherein in a region adjacent to the second lateral surface, a second angle is formed between the long side of the circumscribed rectangle of the ellipse or the long side of the polygon and the first intersection line; wherein the second angle is different from the first angle.

4. The light guide plate according to claim 1, wherein the shape of the polygon is a rectangle or a trapezoid.

5. A backlight module, comprising a light guide plate, wherein the light guide plate is the light guide plate according to claim 1.

6. A display device comprising the backlight module according to claim 5 and a light source located at the light entrance surface.

7. The backlight module according to claim 5, further comprising a first lateral surface adjacent to the light entrance surface; wherein a first intersection line is formed between the first lateral surface and the bottom surface;
   wherein a first angle is formed between a long side of a circumscribed rectangle of the ellipse or a long side of the polygon and the first intersection line.

8. The backlight module according to claim 7, further comprising a second lateral surface opposite to the light entrance surface;
   wherein in a region adjacent to the second lateral surface, a second angle is formed between the long side of the circumscribed rectangle of the ellipse or the long side of the polygon and the first intersection line; wherein the second angle is different from the first angle.

9. The backlight module according to claim 5, wherein the shape of the polygon is a rectangle or a trapezoid.

10. The display device according to claim 6, further comprising a first lateral surface adjacent to the light entrance surface; wherein a first intersection line is formed between the first lateral surface and the bottom surface;
    wherein a first angle is formed between a long side of a circumscribed rectangle of the ellipse or a long side of the polygon and the first intersection line.

11. The display device according to claim 10, further comprising a second lateral surface opposite to the light entrance surface;
    wherein in a region adjacent to the second lateral surface, a second angle is formed between the long side of the circumscribed rectangle of the ellipse or the long side of the polygon and the first intersection line; wherein the second angle is different from the first angle.

12. The display device according to claim 6, wherein the shape of the polygon is a rectangle or a trapezoid.

* * * * *